United States Patent [19]

Cavezzan et al.

[11] Patent Number: 4,954,539
[45] Date of Patent: Sep. 4, 1990

[54] AQUEOUS SILICONE EMULSIONS CONTAINING TIN MONOCHELATE CROSSLINKING CATALYSTS

[75] Inventors: Jacques Cavezzan, Villeurbanne; Michel Peignier, L'Arbresle, both of France

[73] Assignee: Rhone-Poulenc Chimie, Courbevoie, France

[21] Appl. No.: 370,782

[22] Filed: Jun. 23, 1989

[30] Foreign Application Priority Data

Jun. 23, 1988 [FR] France .............................. 88 08702

[51] Int. Cl.$^5$ ............................................... C08L 5/00
[52] U.S. Cl. .......................................... 524/27; 524/56; 524/317; 524/339; 524/732; 524/773; 525/100; 525/474; 428/447; 528/18; 528/31
[58] Field of Search .................... 528/18, 31; 525/100, 525/474; 524/27, 56, 317, 339, 732, 773, 861; 428/447

[56] References Cited

U.S. PATENT DOCUMENTS

| | | | |
|---|---|---|---|
| 4,426,490 | 1/1984 | Dallavia, Jr. et al. | 524/837 |
| 4,624,900 | 11/1986 | Fau | 524/732 |
| 4,873,305 | 10/1989 | Cavezzan et al. | 524/588 |

FOREIGN PATENT DOCUMENTS

| | | |
|---|---|---|
| 0169098 | 1/1986 | European Pat. Off. |
| 2449085 | 4/1976 | Fed. Rep. of Germany |

*Primary Examiner*—Melvyn I. Marquis
*Assistant Examiner*—Karen A. Hellender
*Attorney, Agent, or Firm*—Burns, Doane, Swecker & Mathis

[57] ABSTRACT

Aqueous silicone emulsions, especially useful for rendering a wide variety of substrates nonadhesive/water-repellent by polycondensation crosslinking, contain (a) an α,ω-dihydroxydiorganopolysiloxane, (b) an organohydropolysiloxane containing at least 3 hydrogen atoms bonded to silicon atoms per molecule, (c) a polyvinyl alcohol, (d) a nonionic emulsifying agent, and (e) a crosslinking catalytically effective amount of a monochelate of pentacoordinated tin of valency IV.

8 Claims, No Drawings

AQUEOUS SILICONE EMULSIONS CONTAINING TIN MONOCHELATE CROSSLINKING CATALYSTS

BACKGROUND OF THE INVENTION

1. Field of the Invention

The present invention relates to novel aqueous silicone emulsions crosslinkable by catalysis with a tin monochelate and, more especially, crosslinkable into a thin layer by tin monochelate catalyzed polycondensation reaction.

2. Description of the Prior Art

Emulsions of the above type, which comprise silicones (namely, organosilicon polymers) and whether used alone or in admixture with organic compounds or polymers, have long been known to this art.

They can be used to produce nonadhesive and/or water-repellent coatings, crosslinked into thin films, namely, having thicknesses ranging from a few μm to approximately 200 μm, on a variety of substrates (supports), in particular on cellulose-based materials.

U.S. Pat. Nos. 4,127,460 and 4,288,356, French Pat. Nos. FR-A-2,401,195 and FR-A-2,419,961 and European Pat. No. EP-A-169,098 describe emulsions of this type in which the basic silicone polymer, which is a diorganopolysiloxane α,ω-diol oil having a viscosity not exceeding 500,000 mPa.s, is dispersed in an aqueous medium.

In contrast, U.S. Pat. Nos. 4,008,346 and 4,066,594 and DE-A No. 2,449,085 illustrate emulsions wherein the diorganopolysiloxane α,ω-diol is already emulsion polymerized; the latter is, therefore, in the form of an emulsion. In this case, α,ω-diol polymers having viscosities ranging from oils (500 to 500,000 mPa.s at 25° C.) to resins (above 500,000 mPa.s at 25° C.) may be employed in the final emulsion.

Crosslinking of these emulsions is catalyzed by tin compounds, the most widely employed of which being dialkyltin dicarboxylates such as dioctyltin or dibutyltin dilaurate and dioctyltin or dibutyltin 2-ethylhexanoate.

These catalysts are undoubtedly effective and can easily be formulated into an emulsion. However, when being emulsified and during crosslinking they present the disadvantage of releasing two molecules of fatty acids per molecule of catalyst, and these tend to foul the coating apparatus.

Furthermore, these well-known catalysts, which impart a satisfactory stability (pot life) to baths comprised thereof, may exhibit an inadequate reactivity when the emulsion is crosslinked by heating with the elimination of water.

SUMMARY OF THE INVENTION

Accordingly, a major object of the present invention is the provision of novel silicone emulsions comprising a particular tin crosslinking catalyst, which novel emulsions result in less fouling of coating apparatus therefor, are easily emulsified, and which combine very good reactivity with a sufficient bath pot life.

Briefly, the present invention features the use of a monochelate of pentacoordinated tin of valency IV, as a tin crosslinking catalyst for aqueous silicone emulsions.

DETAILED DESCRIPTION OF THE PREFERRED EMBODIMENTS OF THE INVENTION

More particularly according to the present invention, the aqueous silicone emulsions which can be crosslinked into thin layers characteristically comprise:

(a) 100 parts by weight of a diorganopolysiloxane of the formula:

$$HO(SiR_2O)_nH$$

in which each of the symbols R, which may be identical or different, is an alkyl radical containing from 1 to 3 carbon atoms, a 3,3,3-trifluoropropyl radical or a vinyl radical, at least 50% of the number of the radicals R being methyl radicals and not more than 5% of which are vinyl radicals, and the symbol n is any number which has a value such that the viscosity of the polymer is higher than 500 mPa.s at 25° C.;

(b) 3 to 30 parts by weight of a linear, cyclic or branched liquid organohydropolysiloxane containing at least 3 hydrogen atoms bonded to silicon atoms per molecule, the organic groups bonded to the silicon atoms being methyl, ethyl, propyl or vinyl radicals, at least 80% of the number of such radicals being methyl radicals;

(c) 2 to 20 parts by weight of a polyvinyl alcohol;

(d) 0.1 to 10 parts by weight of a nonionic emulsifying agent; and (e) a catalytically effective amount of a monochelate of pentacoordinated tin of valency IV of the formula (I):

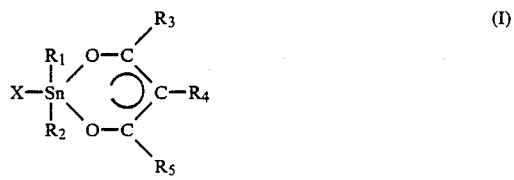

in which the symbols $R_1$ and $R_2$, which may be identical or different, are each optionally substituted $C_1$–$C_{18}$ monovalent hydrocarbon organic radicals.

Particularly representative organic radicals $R_1$ and $R_2$ include:

(i) $C_1$–$C_{18}$ alkyl radicals, halogenated or unhalogenated, such as methyl, ethyl, propyl, isopropyl, butyl, isobutyl, secondary butyl, tert-butyl, pentyl, hexyl, heptyl, 2-ethylhexyl, octyl, decyl, dodecyl, octadecyl, chloromethyl or 2,5-dichloroethyl radicals;

(ii) $C_2$–$C_{18}$ alkenyl radicals, halogenated or unhalogenated, such as vinyl, allyl, methallyl, 2-butenyl, 2-pentenyl, 2-octenyl, 5-fluoro-2-pentenyl or pentadecenyl radicals;

(iii) $C_4$–$C_{10}$ cycloalkyl radicals, halogenated or unhalogenated, such as cyclopentyl, cyclohexyl, methylcyclohexyl, cyclooctyl, 3,4-dichlorocyclohexyl or 2,6-dibromocycloheptyl radicals;

(iv) $C_6$–$C_{15}$ mononuclear aryl radicals, halogenated or unhalogenated, such as phenyl, tolyl, xylyl, cumyl, chlorophenyl, dichlorophenyl, trichlorophenyl, difluorophenyl or trifluoromethylphenyl radicals; and (v) $C_7$–$C_{15}$ mononuclear arylalkyl radicals, halogenated or unhalogenated, such as phenyl, phenylethyl, phenylpropyl or trifluoromethylphenylethyl radicals.

The symbols $R_3$ and $R_5$ in the monochelate of formula (I), may be identical or different, have the same definition as $R_1$ and $R_2$, namely, optionally substituted $C_1$-$C_{18}$ monovalent hydrocarbon organic radicals, and may additionally be hydrogen atoms, cyanoalkyl radicals comprising a $C_2$-$C_4$ alkyl moiety, $C_1$-$C_5$ alkoxy radicals or —Si($R_1$)$_3$ silyl radicals.

Cyanoethyl, cyanopropyl and cyanobutyl radicals are exemplary of the cyanoalkyl radicals, and ethoxy, propoxy and butoxy radicals are exemplary of the alkoxy radicals.

The symbol $R_4$ in the monochelate of formula (I) is a hydrogen atom, or an optionally halogenated $C_1$-$C_8$ hydrocarbon radical.

Particularly representative of the substituent $R_4$ are alkyl radicals, halogenated or unhalogenated, such as methyl, ethyl, propyl, butyl, hexyl or octyl radicals and mononuclear aryl radicals, halogenated or unhalogenated, such as phenyl, tolyl, chlorophenyl or dichlorophenyl radicals.

Furthermore, $R_4$ and $R_5$ may together form a divalent $C_5$-$C_{12}$ cyclic hydrocarbon radical, optionally substituted by chloro, nitro or cyano radicals.

Exemplary of such cyclic radicals are those of the following formulae:

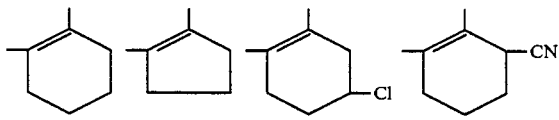

The symbol X in the monochelate of formula (I) is a monocarboxylate radical of the formula $R_6COO$, in which the symbol $R_6$ has the same definition as the symbol $R_1$ above, and preferably is a linear or branched $C_1$-$C_{18}$ alkyl radical.

These monochelates may be identified by NMR spectroscopy analytical techniques ($^{119}Sn$, $^{13}C$ and $^1H$ nuclear magnetic resonance), as well as by mass spectroscopy and by measurement of the Mössbauer effect.

It is found, however, that in the present state of the art of analytical techniques, the $^{119}Sn$ NMR analytical method, such as described particularly in the article by Peter J. Smith, "Chemical shifts of $^{119}Sn$ nuclei in organotin compounds", pages 291 et seq., published in the *Annual Reports on NMR Spectroscopy*, volume 8, Academic Press (1978), is the only technique which is sufficiently precise for characterizing the various tin compounds present in a mixture, in particular a reaction mixture, and for establishing the chemical formulae of most of these compounds.

The fundamental parameter evaluated by means of $^{119}Sn$ NMR is the value of the chemical shift, expressed in parts per million, relative to a reference (generally tetramethyltin).

The value of the chemical shift is particularly sensitive to the electronegativity of the groups borne by the tin and to the change in the coordination number of the tin atom. Specific efforts relating to the characterization of organostannic derivatives on the basis of $^{119}Sn$ NMR are reported by A. G. Davies and P. J. Smith, *Comprehensive Organometallic Chemistry*, 11 Tin, pages 523 to 529 and by J. Otera, *J. of Organometal. Chem.*, 221, pages 57-61 (1981).

The subject monochelates may be prepared, in particular, by reacting a tin oxide of the formula (II):

$$R_1R_2SnO \quad (II)$$

with a β-dicarbonyl compound of the formula (III):

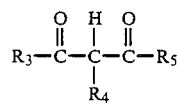

(hereinafter designated by the simplified formula Ch) and an organic acid of the formula (IV):

$$XH \quad (IV)$$

in which formulae $R_1$, $R_2$, $R_3$, $R_4$, $R_5$ and X are as defined above.

This reaction can be carried out in bulk or in an organic solvent (for example cyclohexane) with elimination of water at the reflux temperature of the solvent employed According to this synthesis, the starting materials of formulae (III) and (IV) are reacted in a molar ratio (III)/(IV) ranging from 0.01 to 100, preferably from 0.1 to 10, and even more preferably from 0.5 to 1.5.

In addition, the compound (II) is employed in an amount such that the molar ratio [(II)/(III)+(IV)] ranges from 1/1 to 1/2.5.

The process according to the invention is carried out simply by mixing the starting materials (II), (III) and (IV) in a closed reactor, with protection from atmospheric moisture, with elimination of water. The reaction can be carried out at ambient temperature or at elevated temperatures. It is desirable, nevertheless, to increase the temperature of the reaction mixture to a value which generally ranges from 70° to 120° C. to accelerate the reaction kinetics and/or to eliminate the water formed and/or to solubilize a starting material which is in the solid state at ambient temperature.

The water formed can be removed by any known means, particularly by distilling the reaction mixture under a reduced pressure ranging from 0.01 to 10 kPa for a period of time which depends on the quality of the vacuum employed.

The water formed can also be removed by azeotropic distillation at the reflux temperature of the solvent employed.

In an alternate embodiment of the invention, the reaction of the materials of formulae (II), (III) and (IV) may be carried out not in a single stage, but in two stages.

During the first stage, the tin oxide of formula (II) is reacted with the acid of formula (IV) to produce, after removal of the water formed, a distannoxane of the formula (V):

$$XR_1R_2SnOSnR_1R_2X \quad (V)$$

in which X, $R_1$ and $R_2$ are as defined above.

During the second step, the distannoxane of formula (V) is reacted with the β-dicarbonyl compound of formula (III) and the desired reaction mixture is obtained after removal of the water formed, comprising the tin monochelate of formula (I).

The conditions for carrying out these two stages are similar to those which can be employed for the single-stage process.

The molar ratio (II)/(IV) is preferably equal or very close to 1 and the molar ratio (V)/(III) generally ranges from 1 to 1.5.

Exemplary of the tin oxides of formula (II) which can be used, representative are dimethyltin oxide, diethyltin oxide, dipropyltin oxide, dibutyltin oxide, di(2-ethylhexyl)tin oxide, dilauryltin oxide, dipropenyltin oxide, diphenyltin oxide, ditolyltin oxide, methylethyltin oxide and phenylbutyltin oxide Specific examples of β-dicarbonyl compounds, β-diketones and β-ketoesters of formula (III) which can be employed in the process according to the invention are 2,4-heptanedione, 2,4-decanedione, 2-methyl-2-decene-6,8-dione, 2-methyl-2-nonene-6,8-dione, 1-stearoyl-2-octanone, triacetylmethane, ethyl 7,9-dioxodecanoate, benzoylacetone, 1-benzoyl-2-octanone, 1,4-diphenyl-1,3-butanedione, stearoylacetophenone, palmitoylacetophenone, 1-benzoyl-4-methyl-2-pentanone, benzoyloctacosanoylmethane, 1,4-bis(2,4-dioxobutyl)-benzene, para-methoxybenzoylstearoylmethane, 2-allyl-1-phenyl-1,3-butanedione, 2-methyl-2-acetylacetaldehyde, benzoylacetaldehyde, acetoacetyl-3-cyclohexene, bis(2,6-dioxocyclohexyl)methane, 2-acetyl-1-oxo-1,2,3,4-tetrahydronaphthalene, 2-palmitoyl-1-oxo-1,2,3,4-tetrahydronaphthalene, 1-oxo-2-stearoyl-1,2,3,4-tetrahydronaphthalene, 2-acetyl-1-cyclohexanone, 2-benzoyl-1-cyclohexanone, 2-acetyl-1,3-cyclohexanedione, dibenzoylmethane, tribenzoylmethane, bis(paramethoxybenzoyl)methane, 1-(N-phenylcarbamoyl)-1-benzoylacetone, 1-(N-phenylcarbamoyl)-1-acetylacetone, ethyl acetylacetate, acetylacetone and 1,1,1-trifluoro-3-benzoylacetone.

These various β-diketones of formula (III) are typically prepared by known processes, such as those described in *Organic Reactions*, by R. Adams et al (1954 edition, volume VIII, pages 59 et seq.). Other more specific syntheses are described in *Rec. Trav. Chim. Pays-Bas*, volume 16, pages 116 et seq., by M. J. Kramers (1897), in *J. Chem. Soc.*, volume 127, pages 2891 et seq., by G. T. Morgan et al (1925), or in *J. Chem. Soc.*, pages 1582 et seq., by R. Robinson and E. Seijo (1941).

Exemplary of the acids of formula (IV) according to the present invention, representative are:

(i) saturated carboxylic acids such as formic, acetic, propionic, butyric, isobutyric, valeric, isovaleric, pivalic, lauric, 2-ethylhexanoic, myristic, palmitic and stearic acids, and Versatic ® acids which are mixtures of saturated tertiary monocarboxylic acids containing the same total number of carbon atoms, generally ranging from 8 to 12;

(ii) unsaturated carboxylic acids such as acrylic, propargylic (CH≡C—COOH), propionic (CH$_2$=CH—COOH), methacrylic, crotonic, isocrotonic, oleic and maleic acids; and (iii) carbocyclic acids such as benzoic, phthalic, isophthalic and terephthalic acids.

The monochelate of formula (I) can be prepared substantially pure or in equilibrium with the starting materials and/or the byproducts of the reaction and, in this case, it has been shown according to the invention that the equilibrium reaction mixture can be employed in a catalytically effective amount for curing the silicone emulsions.

It is found that, according to $^{119}$Sn NMR, the equilibrium reaction mixture typically contains, in addition to the pentacoordinated monochelate $R_1R_2SnCh$, the distannoxane $XR_1R_2SnOSnR_1R_2X$, a diorganotin dicarboxylate or dihalide $R_1R_2SnX_2$, and diorganotin bischelate $R_1R_2SnCh_2$ as tin compounds. When a molar ratio of the starting materials (III)/(IV) ranges from 0.5 to 1.5, and a molar ratio (II)/[(III)+(IV)] ranges from 1/1 to 1/2.5 are employed, the contents of the constituents of the reaction mixture in mol %, calculated in gram-atoms of tin metal, are principally:

| | |
|---|---|
| $R_1R_2SnCHX$ | 30 to 95 |
| $R_1R_2SnX_2$ | 30 to 5 |
| $R_1R_2SnCh_2$ | 30 to 0 |
| $XR_1R_2SnOSnR_1R_2X$ | 10 to 0 |

In the description that follows, as in the above description, all parts and percentages are given by weight, unless otherwise indicated.

The tin monochelate and its reaction mixture are described in published French Patent Application Nos. 87/09,178, 87/09,179 and 87/09,180, filed June 25, 1987 and assigned to the assignee hereof.

The catalyst (e) comprising the silicone emulsion, preferably an aqueous silicone emulsion, is incorporated in a sufficient amount to preferably provide from 0.1 to 3 parts of catalyst (e), expressed as tin metal, per 100 parts of polymer (a). The preferred catalysts (e) are di-n-octyltin 1-benzoyl-4-methyl-2-pentanonate 2-ethylhexanoate and di-n-ctyltin 1-benzoyl-4-methyl-2-pentanonate laurate.

The aqueous emulsion according to the invention additionally comprises from 60 to 800 parts of water per 100 parts of polymer (a).

The diorganopolysiloxane (a) may be an oil having a viscosity of from 500 to 100,000 mPa.s or more, namely, up to a viscosity on the order of several million mPa.s.

In the case of viscosities below approximately 100,000 mPa.s, it is possible to employ an oil which is subsequently emulsified. In the case of viscosities above 100,000 mPa.s, it is necessary to employ an emulsion-polymerized diorganopolysiloxane (a) which is therefore already in the form of an aqueous emulsion stabilized with an anionic surface-active agent which also serves as a catalyst during the emulsion polymerization.

Such emulsions of polymer (a), the viscosities of which range from 500 to several million, for example up to 10 million mPa.s at 25° C., are described in U.S. Pat. Nos. 2,891,920 and 3,294,725. The preferred catalyst and surface-active agent for the preparation of such emulsions is dodecylbenzenesulfonic acid and its alkali metal salts, in particular its sodium salt.

The organohydropolysiloxane (b) is incorporated in an amount of 3 to 30 parts, preferably of 4 to 20 parts, per 100 parts of polymer (a).

The polymer (b) may be linear, cyclic or branched. Polymers (b) of these three types are well known materials and are described in detail, for example, in the aforementioned patents and in European Pat. No. EP-A-169,098.

Exemplary nonionic emulsifying agents (d) are especially polyoxyethylenated fatty acids, sorbitan esters, polyoxyethylenated sorbitan esters and polyoxyethylenated alkylphenols.

The polyoxyethylenated alkylphenols are the preferred emulsifiers (d) according to the present invention.

The aqueous emulsions according to the invention may additionally comprise, per 100 parts of polymer (a), at least one of the following additional components:

(f) 0.03 to 6 parts of a thickening agent comprising polysaccharides produced by fermentation of carbohydrates using a microorganism of the genus Xanthomonas;

(g) 15 to 60 parts of a resin comprising recurring units selected from among those of the formulae $R'SiO_{1.5}$, $R'_2SiO$ and $R'_3SiO_{0.5}$, in which each of the symbols $R'$, which may be identical or different, is an alkyl radical containing from 1 to 3 carbon atoms or a vinyl radical, at least 70% of such radicals being methyl radicals, and the units are distributed such as to provide an $R'/Si$ ratio ranging from 1.05 to 1.85, and said resin (g) containing at least 0.2% by weight of hydroxyl radicals bonded to silicon atoms; and (h) 10 to 70 parts of a polyvinyl acetate homo- or copolymer.

Components (f), (g) and (h) are described in detail in European Pat. No. EP-A-169,098. The resin (g) preferably contains $R'SiO_{1.5}$ and $R'_2SiO$ units.

Water is incorporated in an amount of 60 to 800 parts, preferably 100 to 700 parts per 100 parts of (a). The stored aqueous emulsion preferably has a solids content of 20 to 80%. The emulsion can be subsequently diluted when the substrate is being coated.

The aqueous emulsions according to the invention may be formulated in various manners.

A preferred process, in the case where the polymer (a) is not prepared by emulsion polymerization, comprises:

(i) preparing an emulsion $S_1$ by passing, through a colloid mill, a mixture comprising the polymer (a), polyvinyl alcohol (c), a proportion (15% to 70%) of the emulsifier (d), optionally the resin (g) and the thickening agent (f) and water;

(ii) preparing an emulsion $S_2$ by passing, through a colloid mill, a mixture comprising (b) and the remaining proportion of (d) and water; and (iii) intimately mixing the emulsions $S_1$ and $S_2$, optionally together with an aqueous emulsion of (h).

A storage-stable emulsion $S_3$ is thus produced, to which the catalyst (e) is added at the time of use, preferably in the form of an aqueous emulsion $S_4$.

If the polymer (a) is polymerized in emulsion, it suffices to add the emulsion of (a) to the emulsion $S_2$.

It is recommended to disperse the catalyst (e) beforehand in an aqueous emulsion before adding it to the emulsion $S_3$.

This result is easily obtained by employing the techniques previously used for the preparation of the emulsions $S_1$ and $S_2$. Thus, polyvinyl alcohol (c), the catalyst (e) and the water can be premixed and the mixture thus formed can be then emulsified using a colloid mill. The millbase can be diluted with water to the desired concentration such as to provide an emulsion containing, for example, from 8% to 70%, preferably from 10% to 65%, of catalyst (e).

The catalyzed aqueous emulsion compositions are stable for at least 48 hours at ambient temperature; as a result, they can be left in the troughs of coating machines for at least two consecutive working days.

These emulsions can be applied with the aid of devices employed on industrial paper coating machines, such as air blade or scraper bar systems, etc. Once deposited onto the substrates, the aqueous emulsion compositions are cured in a few seconds by transporting same through tunnel ovens heated from about 80° to 220° C. The transport time in these ovens is generally between 1 and 15 seconds and, for a given oven length, it is a function of the speed at which the substrates travel.

From 5 to 15 seconds should be allowed at about 100° to 130° C. for obtaining a correctly spread coating. This period includes the fraction of time required to evaporate off the water; this fraction is frequently greater than ½.

The quantities of compositions deposited onto the substrates can vary and depend on the solids content of the compositions and the required water-repellent and/or non-adhesive properties. It is desirable that the quantities which are deposited should provide from 0.3 to 1.3 g of solids per $m^2$ of surface area to be treated.

The coatings thus produced provide the substrates onto which they are applied with very good nonadhesive and/or water-repellent properties which are maintained over time. These coatings withstand friction well, and consequently are not removed by abrasion when their substrate sheets (or tapes) are conveyed over the return rolls of coating or adhesive-coating machines, which rolls consist of materials whose surfaces are rough to a greater or lesser degree.

In order to further illustrate the present invention and the advantages thereof, the following specific examples are given, it being understood that same are intended only as illustrative and in nowise limitative.

EXAMPLE 1

Synthesis of the catalyst

Into a 250 ml three-necked round-bottom flask fitted with a central stirrer, a condenser and a thermometer were introduced, in succession, 0.1 mole of di-n-octyltin oxide, 0.1 mole of 2-ethylhexanoic acid, 0.1 mole of 1-benzoyl-4-methyl-2-pentanone and 130 ml of cyclohexane.

The mixture was heated under reflux for 2 hours under a nitrogen atmosphere and most of the cyclohexane was then distilled off until the reaction mixture was at a temperature of 90° C.

The reaction mixture was then concentrated in a rotary evaporator for 30 minutes at 70° C. at 0.27 kPa and a light-yellow liquid was obtained, containing:

(i) 51.1 mol % (calculated in gram-atoms of tin metal) of a pentacoordinated tin monochelate of the formula:

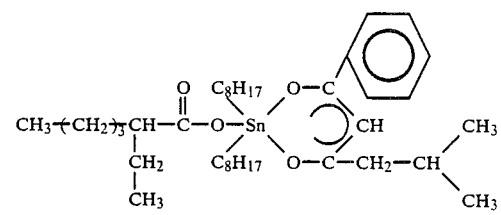

di-n-octyltin 1-benzoyl-4-methyl-2-pentanonate 2-ethylhexanoate;

(ii) 23.4 mol % of a bischelate of the formula:

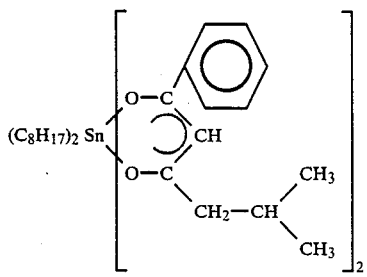

(iii) 19.7 mol % of di-n-octyltin di-2-ethylhexanoate, and (iv) 5.8 mol % of a distannoxane of the formula:

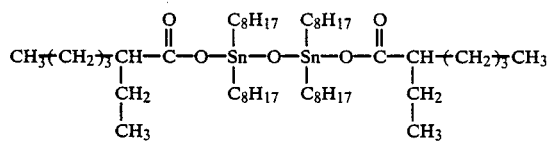

The above molar percentages were determined by $^{119}$Sn NMR according to the abovementioned method described by Peter J. Smith.

EXAMPLE 2

Emulsification of the tin catalyst 389 g of an aqueous solution of polyvinyl alcohol at a concentration of 10% (Rhodoviol ® 25/140), 2.4 g of acetic acid and 58 g of monopropylene glycol were introduced into a two-liter round-bottom flask fitted with a mechanical stirrer. 752 g of a catalytic reaction mixture produced according to the operating procedure of Example 1 were poured into the flask, under stirring, over 45 minutes. 110 g of distilled water were introduced over 15 minutes while stirring was continued.

Stirring of the mixture was continued for 30 minutes and the emulsion was passed through a colloid mill.

344 g of distilled water were added under stirring to the millbase obtained, and the emulsion, which titration showed to contain 6% of tin by weight, was filtered.

EXAMPLE 3

Preparation of the catalyzed emulsion (a) The following constituents were intimately mixed:
(i) 100 parts of a methylhydropolysiloxane blocked with a trimethylsiloxy unit at each end of its polymer chain, having a viscosity of 40 mPa.s at 25° C.;
(ii) 8 parts of a 70/30 weight mixture of two polyoxyethylenated nonylphenols, one containing 10 OCH$_2$CH$_2$ units and the other 20 OCH$_2$CH$_2$ units;
(iii) 15.4 parts of water; and
(iv) 0.5 parts of an aqueous solution containing 40% of acetic acid.

This mixture was emulsified by passing it through a colloid mill. The millbase was diluted by adding 43 parts of water; the emulsion obtained contained 60% of methylhydropolysiloxane.

(b) The following constituents were intimately mixed:
(i) 231 parts of water;
(ii) 20 parts of a polyvinyl alcohol having a saponification number of 140 and a 4% solution of which in water had a viscosity of 25 mPa.s at 25° C.; and (iii) 0.5 parts of a white powder, of alimentary or foodgrade, marketed under the trademark Rhodigel 23; this was a polysaccharide produced by the fermentation of carbohydrates with the aid of Xanthomonas campestris. The process for preparing this polysaccharide is described in French Pat. No. FR-A-2,414,555.

To this mixture were then added:
(iv) 1.5 parts of the 70/30 weight mixture of the two polyoxyethylenated nonylphenols employed under (a);
(v) 120 parts of a liquid resin comprising CH$_3$SiO$_{1.5}$ and (CH$_3$)$_2$SiO units distributed such as to provide a CH$_3$/Si ratio of 1.3, which had a hydroxyl content of 1.8% and a viscosity of 10,000 mPa.s at 25° C.; and
(vi) 250 parts of a dimethylpolysiloxane oil blocked with a hydroxyl radical at each end of its polymer chain, having a viscosity of 5,000 mPa.s at 25° C.

The entire mixture was finely emulsified by passing it through a colloid mill. The millbase was diluted by adding 156 parts of water and the following were incorporated into the diluted millbase, by simple stirring:
(vii) 150 parts of an aqueous emulsion containing 50% by weight of polyvinyl acetate, marketed under the trademark of Rhodopas A 206, which had a Brookfield viscosity, at 50 revolutions/minute, below 150 mPa.s at 25° C. (glass transition temperature: 35° C.);
(viii) 50 parts of the emulsion prepared under (a); and
(ix) 20 parts of monopropylene glycol.

The aqueous emulsion composition thus prepared was highly stable in storage; in particular, after being maintained in a closed container for 6 months at 40° C., it showed no significant loss of SiH groups.

(c) 4 parts of the catalyzing emulsion prepared in Example 2 were added to 100 parts of the emulsion composition prepared under (b) above.

This catalyzed emulsion was then diluted by adding a sufficient amount of water to form a processing bath having a solids content of 10%.

This bath was deposited at a rate of 7 g/m$^2$ onto a kraft paper weighing 70 g/m$^2$, having a supercalendered surface finish.

The deposition was carried out with the aid of a Mayer spreader bar mounted on an industrial paper-coating machine.

The emulsion film covering the paper was simultaneously dried and cured by passing it, for 15 seconds, through a heated tunnel oven, the temperature relating to the paper being 110° C.

A coated paper was thus obtained, one face of which carried approximately 0.7 g/m$^2$ of a perfectly cross-linked thin silicone coating.

The following parameters were evaluated:
(1) the stability (S) of the bath after 24 hours (scored from 0 to 5);
(2) the nonadhesiveness (N/A): an adhesive tape, reference TESA 4651 ®, was applied to the coated face surface of the paper treated according to (d) and this application was maintained for 24 hours at a pressure of 70 g/cm2; the force needed to remove this tape was then measured using a tensometer, the separation rate being 300 mm/minute;
(3) adhesiveness control (A.C. in %): this parameter, which resulted from the subsequent measurement of adhesion, made it possible to evaluate the degree of polymerization of the silicone coating. In the case of A.C.=100, a good polymerization was obtained; in the case of A.C.>100, an insufficient polymerization was obtained.

The results obtained are reported in Table I below.

COMPARATIVE EXAMPLE 3 C

The procedures of Example 3 were repeated, except that the catalyst was replaced with di-n-octyltin di-2-ethylhexanoate, the amount of tin metal introduced being constant.

The results obtained are reported in Table I below.

EXAMPLE 4 and COMPARATIVE EXAMPLE 4 C

The procedures of Examples 2 and 2 C, respectively, were repeated, except that a glassine paper, reference 6621 and marketed by the Sibille ® company, was employed.

The results obtained are also reported in Table I below.

TABLE I

| EXAMPLES | 3 | 3 C | 4 | 4 C |
|---|---|---|---|---|
| Silicone deposit (g/m²) | 0.70 | 0.70 | 0.60 | 0.60 |
| (S) | 4.5 | 4 | 4.5 | 4 |
| N/A (g/cm) | 14 | 18 | 10 | 15 |
| A.C. (%) | 100 | 100 | 100 | 100 |

EXAMPLE 5

Synthesis of the catalyst

The operating procedure of Example 1 was repeated exactly, except that 2-ethylhexanoic acid was replaced with lauric acid.

Using $^{119}$Sn NMR, it was found that the reaction mixture had the following composition:

(i) 61 mol % of a pentacoordinated tin monochelate of the formula:

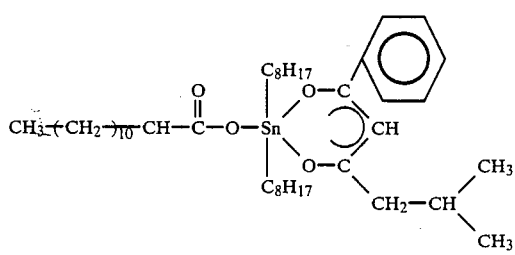

di-n-octyltin 1-benzoyl-4-methyl-2-pentanonate laurate;

(ii) 12 mol % of a bischelate of the formula:

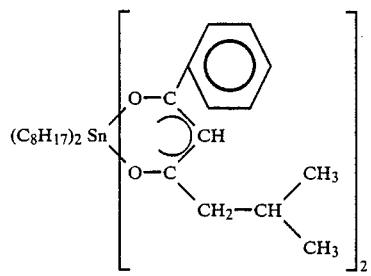

(iii) 27 mol % of di-n-octyltin dilaurate.

EXAMPLE 6

The operating procedure of Example 3 was repeated exactly, except that the tin catalyst employed was the reaction mixture obtained in Example 5 and emulsified according to the operating procedure of Example 2.

The results obtained are reported in Table II below.

COMPARATIVE EXAMPLE 6 C

The procedures of Example 6 were repeated, except that the catalyst was replaced with di-n-octyltin dilaurate, the amount of tin metal introduced being the same.

The results obtained are also reported in Table II below.

TABLE II

| EXAMPLES | 6 | 6 C |
|---|---|---|
| Silicone deposit (g/m²) | 0.70 | 0.70 |
| S | 4.5 | 4 |
| N/A (g/cm) | 12 | 20 |
| A.C. | 100 | 100 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A crosslinkable aqueous silicone emulsion, comprising, emulsified in water, (a) an α,ω-dihydroxydiorganopolysiloxane, (b) an organohydropolysiloxane containing at least 3 hydrogen atoms bonded to silicon atoms per molecule, (c) a polyvinyl alcohol, (d) a nonionic emulsifying agent, and (e) a crosslinking catalytically effective amount of a monochelate of pentacoordinated tin of valency IV.

2. The aqueous silicone emulsion as defined by claim 1, comprising:

(a) 100 parts by weight of a diorganopolysiloxane of the formula:

$$HO(SiR_2O)_nH$$

in which each of the symbols R, which may be identical or different, is an alkyl radical containing from 1 to 3 carbon atoms, a 3,3,3-trifluoropropyl radical or a vinyl radical, at least 50% of the number of the radicals R being methyl radicals and not more than 5% being vinyl radicals, and the symbol n is any number which has a value such that the viscosity of the polymer is higher than 500 mPa.s at 25° C.;

(b) 3 to 30 parts by weight of a linear, cyclic or branched liquid organohydropolysiloxane containing at least 3 hydrogen atoms bonded to silicon atoms per molecule, the organic groups bonded to the silicon atoms being methyl, ethyl, propyl or vinyl radicals, at least 80% of the number of such radicals being methyl radicals;

(c) 2 to 20 parts by weight of a polyvinyl alcohol;

(d) 0.1 to 10 parts by weight of a nonionic emulsifying agent; and (e) a catalytically effective amount of a monochelate of pentacoordinated tin of valency IV of the formula:

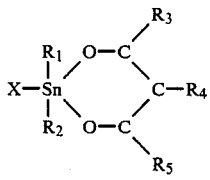 (I)

in which the symbols $R_1$ and $R_2$, which may be identical or different, are each optionally substituted $C_1$–$C_{18}$ monovalent hydrocarbon radicals; the symbols $R_3$ and $R_5$, which may be identical or different, are each a radical $R_1$ or $R_2$, or a hydrogen atom, $C_1$–$C_5$ alkoxy radical or $Si(R_1)_3$ silyl radical; the symbol $R_4$ is a hydrogen atom, or an optionally halogenated $C_1$–$C_8$ hydrocarbon radical, with the proviso that $R_4$ and $R_5$ may together form a divalent $C_5$–$C_{12}$ cyclic hydrocarbon radical optionally substituted by chlorine, nitro or cyano radicals; and the symbol X is a halogen atom or a monocarboxylate radical of the formula $R_6COO$, in which the symbol $R_6$ has the same definition as $R_1$ above.

3. The aqueous silicone emulsion as defined by claim 2, said catalyst (e) comprising di-n-octyltin 1-benzoyl-4-methyl-2-pentanonate 2-ethylhexanoate or di-n-octyltin 1-benzoyl-4-methyl-2-pentanonate laurate.

4. The aqueous silicone emulsion as defined by claim 2, said polymer (a) comprising an oil having a viscosity of from 500 to 100,000 mPa.s at 25° C.

5. The aqueous silicone emulsion as defined by claim 2, said polymer (a) comprising an oil or a resin formulated as an anionically stabilized emulsion.

6. The aqueous silicone emulsion as defined by claim 2, said emulsifying agent (d) comprising a polyoxyethylenated alkylphenol.

7. The aqueous silicone emulsion as defined by claim 2, further comprising, per 100 parts by weight of polymer (a), at least one of:
 (f) 0.03 to 6 parts by weight of a polysaccharide thickening agent produced by fermentation of a carbohydrate using a microorganism of the genus Xanthomonas:
 (g) 15 to 60 parts by weight of a resin comprising recurring units of the formulae $R'_2SiO_{1.5}$, $R'_2SiO$ and $R'_3SiO_{0.5}$, in which each of the symbols R', which may be identical or different, is an alkyl radical containing from 1 to 3 carbon atoms or a vinyl radical, at least 70% of the radicals R' being methyl radicals, and such units being distributed as to provide an R'/Si ratio ranging from 1.05 to 1.85, and the resin (g) containing at least 0.2% by weight of hydroxyl units bonded to silicon atoms; or
 (h) 10 to 70 parts by weight of a polyvinyl acetate homo- or copolymer.

8. A substrate, at least one face surface of which being coated with the aqueous silicone emulsion as defined by claim 1.

* * * * *